US012522016B2

(12) United States Patent
Eads et al.

(10) Patent No.: US 12,522,016 B2
(45) Date of Patent: Jan. 13, 2026

(54) TAXIDERMY DISPLAY UNIT AND RELATED METHOD OF USE

(71) Applicant: Wicked North Gear LLC, Hudson, WI (US)

(72) Inventors: Thad Eads, Urbana, IN (US); Jason Eads, Mt. Sterling, IL (US)

( * ) Notice: Subject to any disclaimer, the term of this patent is extended or adjusted under 35 U.S.C. 154(b) by 778 days.

(21) Appl. No.: 17/947,783

(22) Filed: Sep. 19, 2022

(65) Prior Publication Data

US 2023/0092652 A1 Mar. 23, 2023

Related U.S. Application Data

(60) Provisional application No. 63/245,294, filed on Sep. 17, 2021.

(51) Int. Cl.
*B44C 5/02* (2006.01)

(52) U.S. Cl.
CPC .................................... *B44C 5/02* (2013.01)

(58) Field of Classification Search
CPC ................ B44C 5/00; B44C 5/02; B44C 5/04
USPC ................................................ 434/295, 296
See application file for complete search history.

(56) References Cited

U.S. PATENT DOCUMENTS

| | | | | |
|---|---|---|---|---|
| 5,064,725 A * | 11/1991 | Acker | B44C 5/02 | 428/6 |
| 5,437,935 A * | 8/1995 | Fredeen | B44C 5/02 | 428/6 |
| 6,451,393 B1 * | 9/2002 | Ploetz | B44C 5/00 | 224/103 |
| D706,672 S * | 6/2014 | Bray | D11/158 | |
| 8,764,453 B2 * | 7/2014 | Swarthout | B44C 5/02 | 40/538 |
| 8,858,235 B2 * | 10/2014 | Bain | B44C 5/02 | 434/296 |
| 9,180,730 B2 * | 11/2015 | Miller | B44C 5/06 | |
| 9,346,315 B2 * | 5/2016 | Powell | B44C 5/02 | |
| 2003/0082316 A1 * | 5/2003 | Scott | B44C 5/02 | 428/16 |

* cited by examiner

*Primary Examiner* — Kurt Fernstrom

(74) *Attorney, Agent, or Firm* — Skaar Ulbrich Macari, P.A.

(57) ABSTRACT

A turkey beard display and a method of displaying a turkey beard is provided. The method can include inserting a turkey beard into a body so that connective tissue of the turkey beard that is joined with a plurality of hairs passes by a plurality of arms projecting inward toward a longitudinal axis of the body such that the connective tissue passes by the plurality of arms to thereby enter an interior compartment. The arms can penetrate into and among the plurality of hairs to secure the turkey beard to the body.

20 Claims, 5 Drawing Sheets

TAXIDERMY DISPLAY UNIT AND RELATED METHOD OF USE

This application claims the benefit of provisional patent application Ser. No. 63/245,294, filed Sep. 17, 2021, which is hereby incorporated by reference herein in its entirety.

BACKGROUND OF THE INVENTION

The present invention relates to taxidermy, and more particularly to a display unit configured to hold and retain a turkey beard for display.

There are a variety of taxidermy specialties in the hunting and outdoor industries in North America. One popular specialty involves the antlers of deer, elk and other cervids, which are displayed to memorialize the hunt or the animal. Another popular specialty involves the beard, spurs and/or feathers of turkeys. With regard to the latter, male turkeys grow beards on their chests. The beards often reflect the age of the turkey. The longer the beard, the older the turkey in most cases. Many hunters prefer taking an older turkey to reflect their hunting skills because older birds frequently are more difficult to harvest. Most hunters retain the beard of harvested turkeys in one form or another for the memories. After time, however, the beard can end up laying around, stuffed in a drawer, or collecting dust on a shelf.

Many times, however, after a turkey is harvested, it can be mounted as a full body mount by a taxidermist. Other options include displaying a fan of feathers of the turkey on a plaque, accompanied by the spurs and/or feet, and the beard of the turkey. A common do-it-yourself option for turkey taxidermy is to modify a shotgun shell (used to harvest the turkey) and secure the beard within the brass portion of the shell with hot glue. By doing so, the hunter can also retain the shotgun shell they used to harvest the turkey, along with the beard to capture the memory. All the above solutions above require a significant amount of time and money with a taxidermist, or a considerable time investment for a hunter to mount and preserve the turkey beard on their own.

Accordingly, there remains room for improvement in the field of turkey beard taxidermy to preserve the beard and incorporate it into an easy to use display unit.

SUMMARY OF THE INVENTION

A turkey beard display unit and method of displaying a turkey beard is provided.

In one embodiment, the turkey beard display unit can include a tubular body defining an interior compartment, a longitudinal axis extending through an upper end and a lower end; and multiple arms projecting inward toward the longitudinal axis in an array about the longitudinal axis so as to surround the longitudinal axis and/or an insertion opening aligned with the longitudinal axis.

In another embodiment, the arms are configured to penetrate into a plurality of hairs under a connective tissue of a turkey beard, when the turkey beard is at least partially inserted through the insertion opening. With this action, the connective tissue can remain trapped between the upper end and the lower end with the connective tissue being concealed within the tubular body and suspended above the plurality of arms.

In still another embodiment, the arms can project radially inward toward the longitudinal axis, with each terminating at an arm tip. A first arm tip on a first side of the longitudinal axis can be between 0.1 inches and 0.75 inches, or between 0.2 inches and 0.5 inches away from a second arm tip on an opposing second side of the longitudinal axis.

In yet another embodiment, the arms can be configured to bend so that arm tips thereof move toward an upper end of the tubular body as the connective tissue engages the arms. The arms also can rebound away from the upper end of the tubular body after the connective tissue passes the arms so the arm tips intermingle and penetrate between and individual, adjacent hairs of the beard.

In even another embodiment, the display unit can include a hanger secured to the tubular body. The hanger can define a hole through which a cord can be installed to hang or secure the tubular body in a display configuration.

In a further embodiment, a method of displaying a turkey beard is provided. The method can include inserting a turkey beard into a tubular body so that connective tissue of the turkey beard that is joined with multiple hairs passes by a plurality of arms projecting inward toward a longitudinal axis of the tubular body such that the connective tissue passes by the plurality of arms to thereby enter an interior compartment. The arms can penetrate into the hairs to secure the turkey beard to the tubular body.

In still a further embodiment, the method can include bending the arms so that arm tips thereof move toward an upper end of the tubular body as the connective tissue engages the arms. In some cases, the arms can rebound away from the upper end of the tubular body after the connective tissue passes the plurality of arms.

In yet a further embodiment, the arms can bend inward toward the interior compartment during the inserting step as they are pushed by the connective tissue. The arms can include arm tips. Each arm tip can move in an arc away from the longitudinal axis during the inserting step.

In even another embodiment, the tubular body can include an enlarged, optionally elliptical or oval opening that can accommodate multiple turkey beards installed in the display unit simultaneously.

The current embodiments provide an apparatus and method for efficient and aesthetically pleasing display of a turkey beard from a harvested turkey. Where included, the arms provide a quick and easy installation of the beard relative to the body and display unit. The arms can effectively trap the beard in place so that it remains installed indefinitely. In cases where a hanger is provided, the display unit can be hung or carried with a cord. The display unit also can be configured so that glue, cement or other secondary fasteners are not used to secure the beard to the display unit.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and are being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

Figure 1:
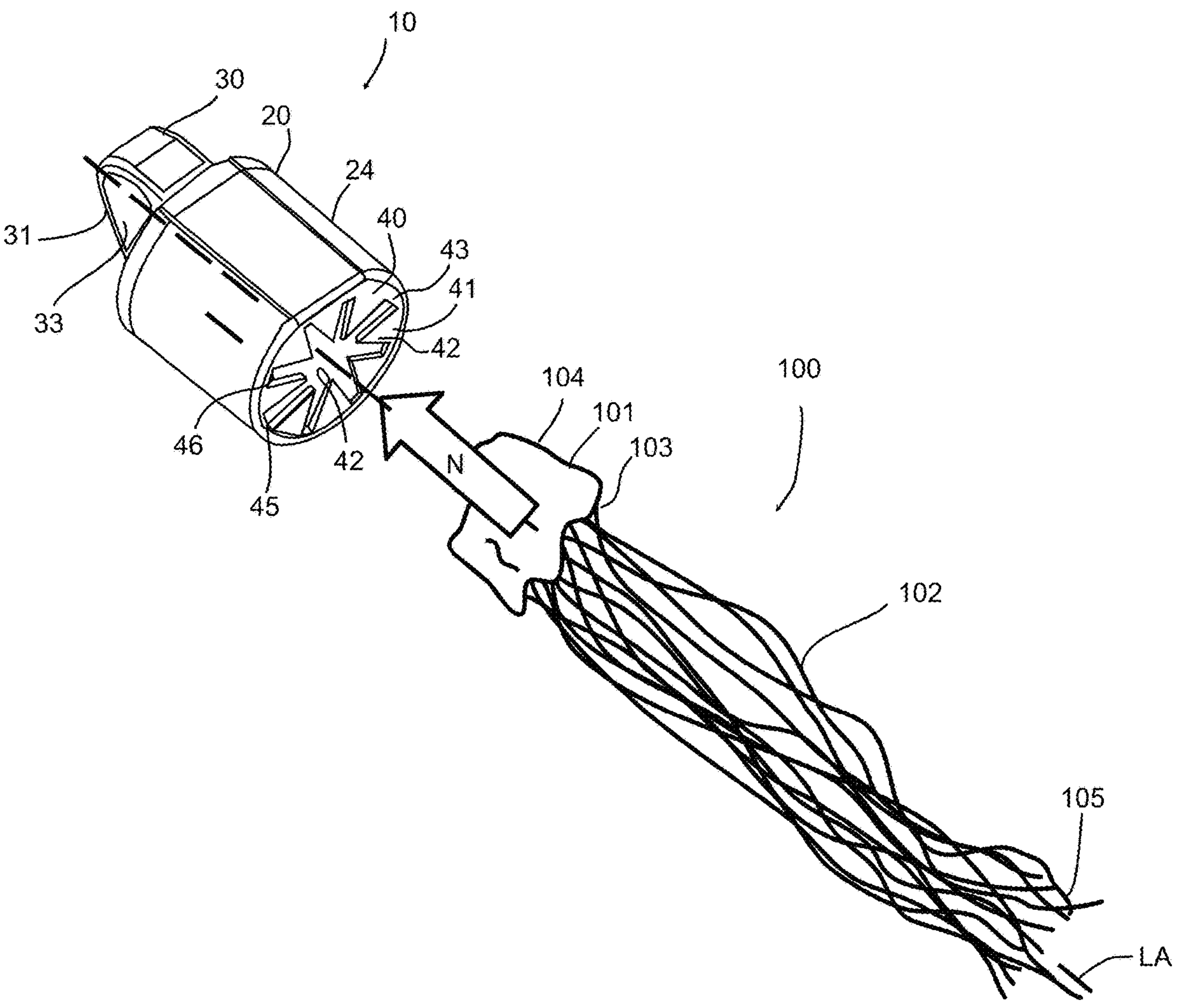
FIG. 1 is a perspective view of the beard holder of a current embodiment as a turkey beard is about to be installed relative thereto.
Figure 2:
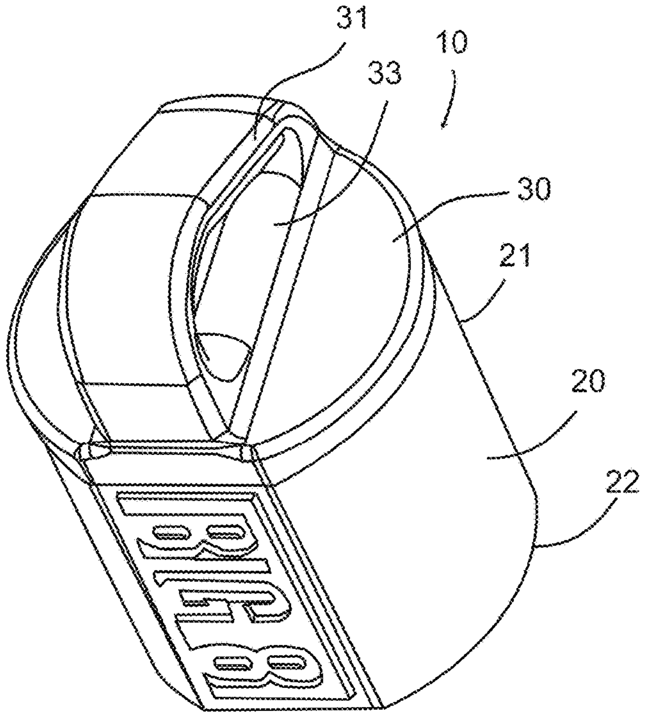
FIG. 2 is a top perspective view of the beard holder.

FIGS. 1-6 and generally designated 10. The unit 10 is shown in FIG. 1 with a turkey beard 100 as the turkey beard 100 is being installed in direction N into the unit 10. As used herein, the turkey beard 100 can be a beard or other appendage of a turkey, bird or other game. As illustrated, the turkey beard 100 can include connective tissue 101 and multiple hairs or strands 102. The connective tissue can include a lower portion 103 into which the hairs 102 project. The beard also can include a first beard end 104 and a second beard end 105. The connective tissue 101 can be disposed at the first beard end 104. The hairs 12 can extend therefrom to the second beard end 105. In some cases, the connective tissue 101 can be considered less aesthetically pleasing, which is why it optionally can be concealed within the display unit 10 as described below.

With reference to FIGS. 1-4, the display unit 10 can include a tubular body 20 defining an interior compartment 23. The unit 10 and tubular body 20 can include an upper or first end 21 and a second or lower end 22. Although shown as a generally cylindrical structure, as used herein, tubular body can be any structure defining a void and having any cross section, for example, a round, circular, pill shaped, polygonal, star shape or other shape cross section. A longitudinal axis LA can extend through the unit 10 generally from the upper end 21 through the lower end 22. As shown, the tubular body 20 can circumferentiate and/or surround the longitudinal axis LA. The tubular body also can include one or more sidewalls 24. The sidewalls 24 can surround the longitudinal axis LA and can extend from the upper end to the lower end. In some cases, the tubular body 20 can include a cap or upper portion 30, which can be integral with, or separate but connected to, the body. This upper portion can include a hanger 31 which extends upwardly away from a base 32 of the cap 30. The hanger 31 can define an aperture 33 through which a cord, string, rope, or other elongated element (collectively referred to as a cord herein), can be extended to hang the display unit from a particular location in a display configuration. Although shown as a part of the cap, the hanger itself can be a cord connected to the cap or the body.

Optionally, a display unit 10 can include one or more tubular bodies and sets of retention arms as described below. In some cases, two, three, four or more interior compartments can be defined in a single tubular body, which can be segmented and can include multiple sets of retention arms associated with the interior compartments or tubular bodies. With this construction, multiple beards can be secured relative to respective interior compartments with the retention arms.

Figure 3:
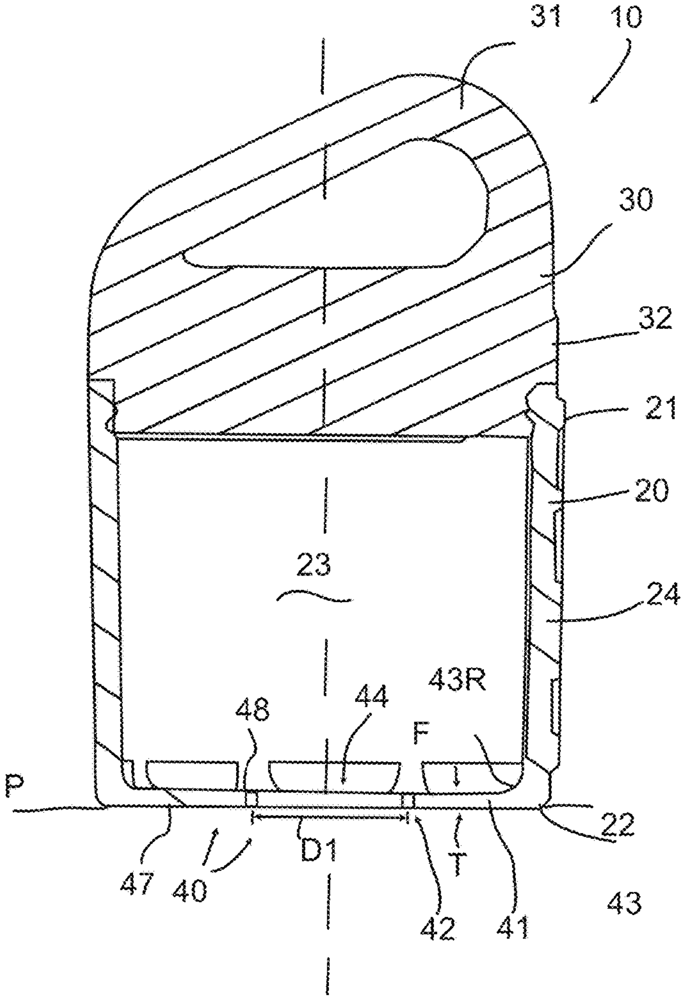
FIG. 3 is a section view of the beard holder.
Figure 4:
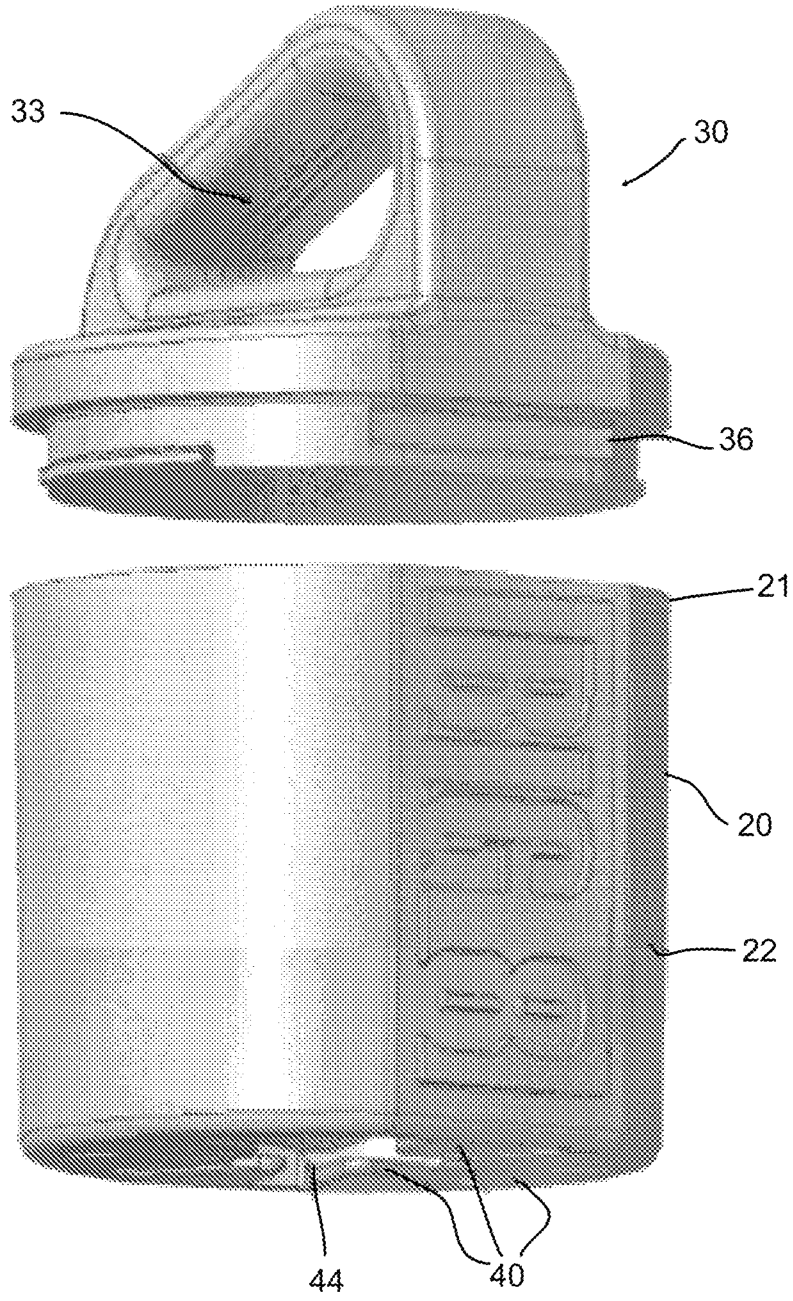
FIG. 4 is an exploded perspective view of the beard holder.

With reference to FIGS. 1-4, the cap 30 can be integral with or can be joined with the tubular body 20 in a variety of manners. In some cases, the cap also can be absent, with the tubular body simply connected to another structure, with or without a hanger. The interior compartment can be open in that configuration if desired. Optionally, as shown, the cap 30 can have a similar outer perimeter and shape as the tubular body 20. The cap 30 can be solid as shown in FIG. 3. The cap 30 can include a first lock element 36 that engages a second lock element 26 of the tubular body 20. As shown, the first lock element 36 can be configured as a recess, hope or aperture. The second lock element 26 can be configured as a projection or ridge 26 that can fit within the recess 36 and lock the cap 30 relative to the body 20. Of course, these elements can be reversed with the recess and projection on the other portions. In other applications, the cap 30 can be glued, welded, fastened or integrally formed with the tubular body 20. Optionally, the cap 30 can completely close off the interior compartment 23 at the upper end 21 of the tubular body 20. In other applications, a small hole or vent can be defined in the cap 30, extending from the interior compartment 23 to the exterior of the unit 10. As mentioned above, the tubular body 20 can define the interior compartment 23 which can be surrounded by one or more sidewalls 24. The sidewall 24 can extend downward, from the upper end 21 to the lower end 22.

The lower end 22 as illustrated can include one or more retention arms 40. These arms 40 can project inward, optionally toward the longitudinal axis LA or generally toward an opposing side of the sidewall 24 or tubular body 20. The arms can be arranged in an array about the longitudinal axis LA so as to surround it. These arms can optionally surround an insertion opening 44 that can be disposed inwardly from the sidewall 24.

As shown in FIG. 1, the arms 40 can collectively define a starburst or generally asterisk-shaped opening 45 that further includes and is continuous with the insertion opening 44. The starburst opening 45 can include the insertion opening 44 at its center, with a plurality of slots 46 that emanate radially outward from the longitudinal axis LA and/or the insertion opening. The slots 46 can be similarly shaped, and as shown are generally of a rectangular shape. Of course, other shapes, such as triangular, square, rounded or elongated shapes can be used, depending on the application.

As further shown in FIGS. 1 and 3, each of the arms 40 can project radially inward toward the longitudinal axis LA, with each arm terminating in an arm tip. As shown there, an exemplary first arm 41 can extend inwardly from the sidewall 24 in a cantilevered manner, projecting generally toward the longitudinal axis LA. The other arms 40 in the array can be similarly constructed and project inwardly in a like manner, optionally at varying angles or degrees relative to the first arm 41. For example, a second arm 47 can extend inward toward the longitudinal axis, generally opposing the first arm 41. The second arm and the other arms can be similar to the first arm 41 as shown, or the arms can vary from one to the next, depending on the application and holding function relative to the inserted turkey beard 100.

The first arm 41 can extend inward and can terminate at an arm tip 42. This arm tip can be a pointed, rounded or angled edge or end of the arm 41. This arm tip 42 can be the closest portion of the arm 41 to the longitudinal axis LA in the opposing side wall of the tubular body for 20. This arm tip 42 can be distal from the base 43 of the first arm 41. The base 43 can connect to the sidewall 24 directly. The base 43 also can include a radiused portion 43R that faces toward the interior compartment 23. This radiused portion can provide extra support to the cantilevered part of the first arm 41 extending to the arm tip 42. The arm 41 as shown can generally be in the form of a triangular element. Optionally, the arms can be square, rectangular, rounded or other type of element. Further optionally, the arms can be in the form of bristles, fibers or strands.

Figure 5:
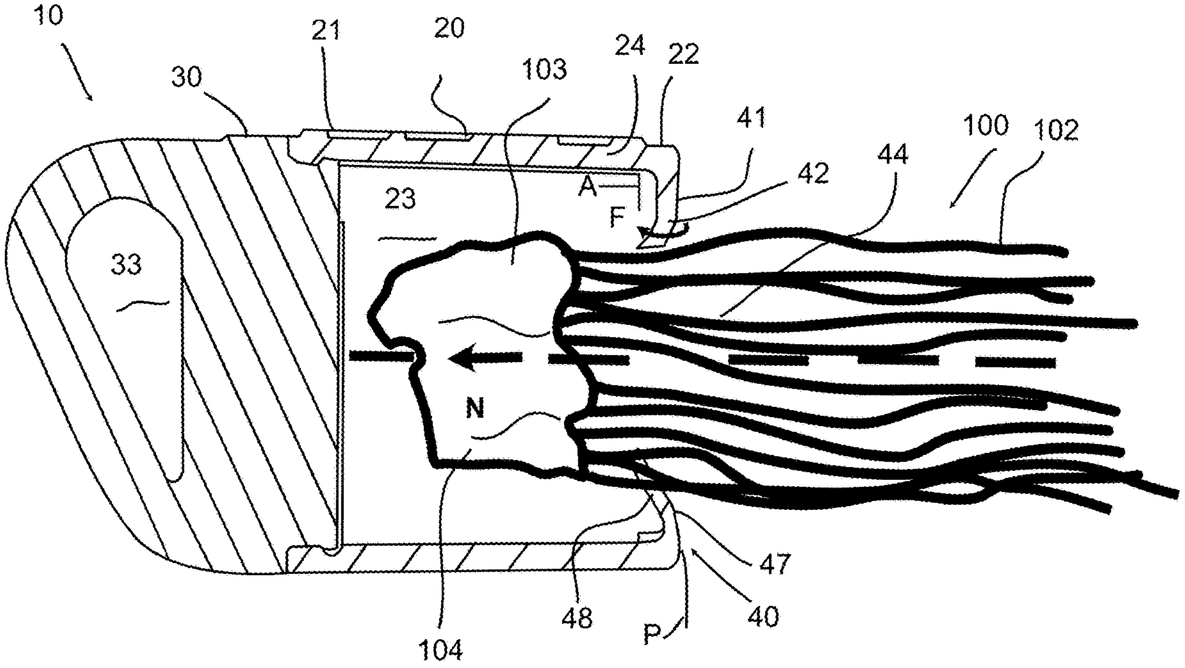
FIG. 5 is a section view of the beard holder as a beard penetrates retention arms thereof.

When an optional triangular element as shown, the arm 41 can become wider as it extends away from the longitudinal axis LA toward a sidewall 24 of the tubular body 20. The arm 41 also can be wider at the base 43 than the tip 42. This can allow the tip 42 to bend and flex in direction F as shown in FIGS. 3 and 5 as described below. The arm 41 also can be of a thickness T that is optionally less than 0.100 inches, less than 0.050 inches or less than 0.025 inches. With this diminutive thickness T, the arm 41 can be configured to flex in direction F and rebound back to the configuration shown in FIG. 3, which can place the arm in a common plane P with the other arms of the unit.

The arm tips of each of the respective arms 40 can, as mentioned above, extend inwardly, and can define the innermost portion of the insertion opening 44. As illustrated in FIG. 3, tips on opposing sides of the longitudinal axis LA can be separated a particular distance D1 from one another. For example, the first arm tip 42 of the first arm 41 on a first side of longitudinal axis LA can be separated a distance D1 from a second arm tip 48 of a second arm 47 on an opposing side of the longitudinal axis LA. The distance D1 can be selected to fit a variety of different sized turkey beards 100. It has been discovered that when the distance D1 is between 0.1 inches and 0.75 inches, the insertion opening can fit virtually all naturally occurring turkey beards. Therefore, the distance D1 can be optionally 0.1 inches to 0.75 inches, 0.2 inches to 0.5 inches, 0.3 inches to 0.4 inches, or about 0.3 inches to satisfactorily fit most turkey beards, and accommodate the connective tissue 101 passing through the insertion opening 44 to retain it within the interior compartment 23 of the tubular body 20.

Figure 6:
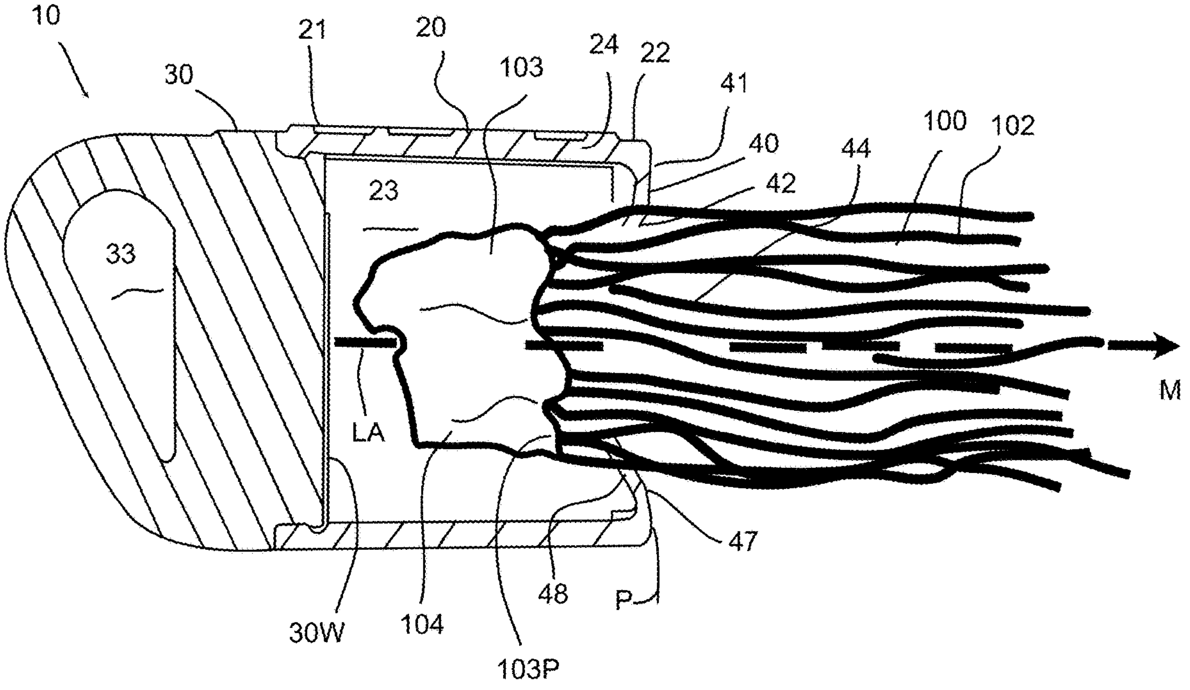
FIG. 6 is a section view of the beard holder as the beard is retained in the beard.

With reference to FIGS. 5 and 6, a method of using the turkey beard display unit 10 will now be described. That method of displaying a turkey beard can generally include inserting a turkey beard 100 into a tubular body 20 so that connective tissue 101 of the turkey beard that is joined with a plurality of hairs 102 passes by a plurality of arms 40 projecting inward toward a longitudinal axis LA of the tubular body 20 such that the connective tissue passes by the plurality of arms to thereby enter an interior compartment 23. The plurality of arms 40 can penetrate into the plurality of hairs to secure the turkey beard 100 to the tubular body 20 and generally relative to the unit 10.

More particularly, as shown in FIG. 1, the turkey beard 100 can be provided and oriented such that the first beard end 104 is aligned with the longitudinal axis LA and aimed toward the insertion opening 44. The connective tissue 103 can be of a variety of random and naturally occurring shapes, with a variety of different contours depending on the particular beard. The hairs 102 can extend toward the second beard end 105. The first beard end 104 can be pressed against the arms 40, generally centered in the insertion opening 44 or relative to the longitudinal axis LA of the tubular body 20. The first beard end can be moved or pushed in direction N with a slight force applied by a user holding the hairs 102 of the turkey beard 100 and pushing further in direction N. As the connective tissue 103 of the first beard end 104 press against the arms 40, the arms can begin to bend in direction F as shown in FIG. 5. The arms 40 can bend inwardly into the interior compartment 23 away from the plane Pin which the lower surfaces of the arms 40 are originally disposed before insertion of the turkey beard 100 into the display unit 10. The first end 104 and connective tissue 103 can continue to be moved in direction N into the interior compartment. The hairs 102 can begin to engage the arms 40. As this occurs, the arms and in particular the arm tips can penetrate into and among the individual hairs located under the connective tissue, between the first beard end 104 and the second beard end 105. These arms effectively can trap the connective tissue 103 and the first beard end 104 in the compartment 23 of the tubular body 20. Where the arm tips 42 and 48 are pointed, angular and/or rounded, the arm tips 42 and 48 can satisfactorily penetrate among and between the respective ones of the hairs.

As the first beard end 104 of the beard is pushed into the interior compartment, the arms bend, flex, deform, move or otherwise are modified from their original unbiased mode shown in FIG. 3. Any of these motions are considered collectively as a bending motion or that the arms bend. As the arms bend, they move inward, toward the interior compartment 23 as they are pushed in direction N by the connective tissue 103 and/or the beard 10 to engage them. In this motion, arm tips of the arms can move toward the upper end of the tubular body as the connective tissue and/or the hairs engage the arms. Optionally, as the arms bend, the arm tips can move along an arcuate path. For example, the first arm tip 42 moves along an arc slightly away from the longitudinal axis LA during the inserting step. The other arms can likewise move along similar arcs. These arcs can be very slight, and in some cases can be linear depending on the bending action of the respective arm. Further optionally, during the inserting step, the arm tips can move relative to their respective base and relative to the longitudinal axis as the arm tip engages the connective tissue and/or the hairs of the turkey beard.

In some cases, the distance D1 between the first arm tip 42 of the first arm 41 and the second arm tip 48 of the second arm 47 on an opposite side of longitudinal axis LA can change during the insertion and securement steps. For example, the distance D1 can increase when the connective tissue 103 and/or the hairs 102 enter the insertion opening 44 defined between the arm tips. As the arms flex, the distance D1 can further increase. After the connective tissue has passed the arms, and the beard 100 is gently pulled in direction M shown in FIG. 6, the distance between arm tips optionally can return or decrease back to the original distance D1 shown in FIG. 3 or a distance slightly larger than that if the arms remain slightly bent.

When the connective tissue 103 and the first beard end 104 have been satisfactorily inserted into the interior compartment 23, the connective tissue 103 optionally can be past the arms 40. Optionally, when this occurs, the arms 40 can rebound away from the upper end 21 of the tubular body 20. For example, as shown in FIG. 6, the arm tips and/or the arms can move or rebound in a direction R. This can occur naturally and/or can be facilitated by gentle pulling on the beard 100 in direction M by user holding the hairs 102. In other cases, the force M can simply be exerted by gravity acting on the turkey beard hanging in a suspended display unit 10. In this condition, the arm tips can penetrate into the hairs and can be disposed below the connective tissue 103. In some cases, parts 103P of the connective tissue 103 can rest on or engage a portion of an arm, such as the arm 47 shown in FIG. 6. In other cases, the connective tissue may be suspended or more fully inserted into the interior compartment 23, and might not engage the arms at all. Optionally, the connective tissue 103 and/or the first beard 104 and can directly engage the hanger 30 along an upper wall 30W.

With the turkey beard 110 installed in the unit 10, the arms and/or arm tips thereof can penetrate between and among the hairs of the turkey beard, optionally below the connective tissue. The connective tissue can be trapped within the interior compartment. Optionally the connective tissue can be trapped between the lower end 22 and the upper end 21 of the tubular body, and optionally above the arms 40. With the turkey beard inserted into the display unit 10, and optionally trapped with its beard's upper end 104 in the interior compartment 23, the beard 100 can be firmly secured to the display unit 10. Thereafter, the display unit 10 can be optionally joined with a cord extending through the opening 33 of the cap 30 and displayed in a desired orientation and/or location by user.

In the embodiments shown, the turkey beard 100 optionally can be fully installed in the tubular body 20 and in particular the display unit 10 without the use of any glue, cement or adhesive. The arms can effectively secure the turkey beard 100 and the tubular body completely and entirely relative to the other components of the display unit 10. Of course, in some limited applications, a user can add newer cement to yet further secure the turkey beard relative to the tubular body 20 and display unit 10.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation (s).

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

What is claimed is:

1. A method of displaying a turkey beard, the turkey bearding having a plurality of hairs extending from a piece of a connective tissue, the method comprising the steps of:

providing a body defining an interior, the body having opposed ends with at least one the opposed ends having a plurality of flexible arms projecting inwardly toward a central axis of the body, the plurality of flexible arms defining an insertion opening into the interior; and inserting the connective tissue of the turkey beard into the insertion opening of the body such that the connective tissue passes at least partially by the plurality of flexible arms and into the interior of the body, wherein the plurality of flexible arms are adapted to engage the connective tissue.

2. The method of claim 1, wherein the step of inserting the connective tissue into the insertion opening further comprises the step of inserting the connective tissue completely past the plurality of flexible arms, wherein the connective tissue is contained within the interior of the body.

3. The method of claim 2, further comprising the step of the plurality of flexible arms penetrating into the plurality of hairs, wherein the plurality of flexible arms retains the connective tissue within the interior of the body.

4. The method of claim 1, wherein the hairs of the turkey beard extend from a lower end of the body.

5. The method of claim 1, wherein the plurality of flexible arms each have at least one terminating arm tip.

6. The method of claim 5, wherein terminating arm tips of opposed flexible arms are between 0.1 inches and 0.75 inches away from each other.

7. The method of claim 1, wherein each of the plurality of arms becomes wider as each flexible arm extends away from the central axis of the body.

8. The method of claim 1 further comprising the step of:

bending the plurality of arms during the inserting step from an unbent position toward a bent position.

9. The method of claim 8, wherein the plurality of flexible arms bend inward toward the interior compartment during the inserting step as the plurality of arms are pushed by the connective tissue.

10. The method of claim 9, wherein each of the flexible arms rebounds back towards the unbent position to penetrate between and among the hairs of the turkey beard.

11. The method of claim 1, wherein each of the plurality of flexible arms includes a base joined with a sidewall of the body, wherein each of the plurality of flexible arms includes an arm tip distal from the base and from the sidewall, wherein during the inserting step the arm tip moves relative to the base and relative to a longitudinal axis as the arm tip engages at least a portion of the connective tissues.

12. The method of claim 1, further comprising the step of hanging the body in a location by inserting a support device into a hanger member extending from the a portion of the body, the hanger member having at least one aperture extending through it to receive the support device.

13. A display device for displaying a turkey beard having a plurality of hairs extending from a piece of a connective tissue, the display device comprising:

a body comprising opposed ends and a peripheral wall defining an interior of the body; and a plurality of flexible arms formed on at least one of the opposed ends, each of the flexible arms projecting inwardly toward a central axis of the body defining an insertion opening into the interior of the body;

wherein the flexible arms are adapted to bend to allow at least partial insertion of the connective tissue of the turkey beard into the insertion opening of the body.

14. The display device of claim 13, wherein the plurality of flexible arms are configured to engage at least one of the connective tissue or the hairs of the turkey beard.

15. The display device of claim 13, wherein the plurality of flexible arms are formed in a lower opposed end of the body, wherein the hairs of the turkey beard hang below the body.

16. The display device of claim 13, wherein each of the plurality of flexible arms comprises at least one terminating arm tip configured to engage at least one of the connective tissue or hairs of the turkey beard.

17. The display device of claim 16, wherein the terminating arm tips of opposed flexible arms are between 0.1 inches and 0.75 inches away from each other.

18. The display device of claim 13, wherein each of the plurality of arms becomes wider as each flexible arm extends away from the central axis of the body.

19. The display device of claim 13 further comprising a hanging member extending from at least a portion of the body to permit hanging of the body from a support member, the hanging member having an aperture extending at least partially through it to receive the support member.

20. The display device of claim 19, wherein the hanging member extends from an upper opposed end of the body opposite the lower opposed end of the body.

* * * * *